April 29, 1952  A. BERGERON  2,594,282
PISTON RING CONSTRUCTION
Filed Nov. 22, 1949  2 SHEETS—SHEET 1
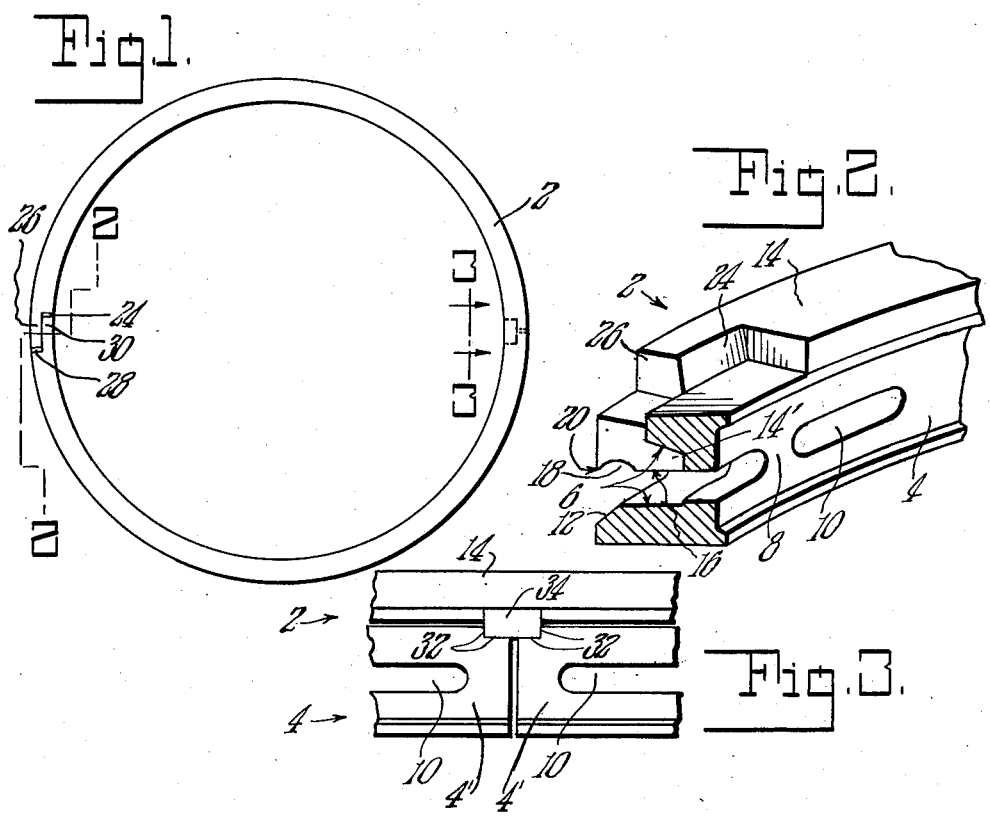
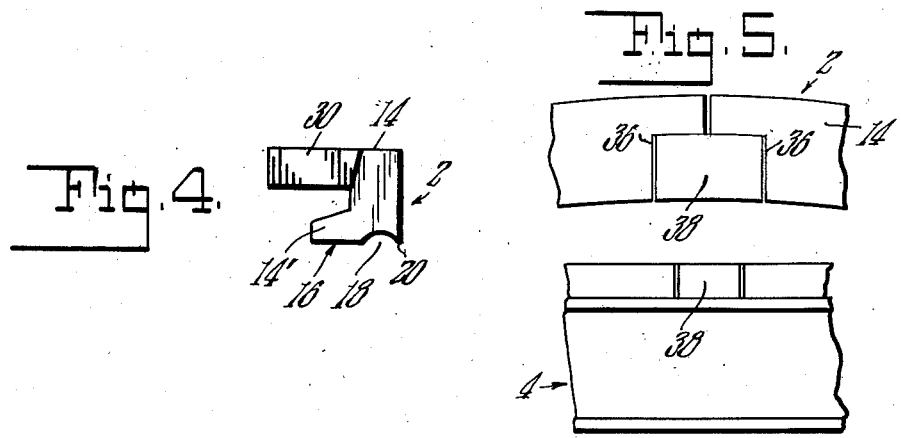
INVENTOR.
Alfred Bergeron
BY April 29, 1952     A. BERGERON     2,594,282
PISTON RING CONSTRUCTION Filed Nov. 22, 1949     2 SHEETS—SHEET 2

*INVENTOR*
ALFRED BERGERON

BY *Mason, Mason & Sheridan*

ATTORNEYS

Patented Apr. 29, 1952

2,594,282

UNITED STATES PATENT OFFICE 2,594,282

PISTON RING CONSTRUCTION

Alfred Bergeron, Chicopee Falls, Mass.

Application November 22, 1949, Serial No. 128,891

8 Claims. (Cl. 309—44)

1

This invention relates to piston rings for the pistons of internal combustion engines and the like.

The principal object of the invention is the provision of piston ring construction which includes interlocking upper and lower compression and oil ring sections having means for preventing relative rotation of said sections.

Another object is to provide an improved ring of the type having radial slots to permit movement of oil.

The above objects I accomplish by means of such structure and relative arrangement of parts thereof, as will fully appear from the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Fig. 1 is a plan view of piston ring construction embodying the novel features of the invention;

Fig. 2 is a sectional view on the line 2—2 of Fig. 1;

Fig. 3 is an elevational view on the line 3—3 of Fig. 1;

Fig. 4 is an end view of the upper ring;

Fig. 5 is a plan view of a modification of the ring construction showing a lock;

Fig. 6 is an elevational view of the ring in Fig. 5.

Figure 7:
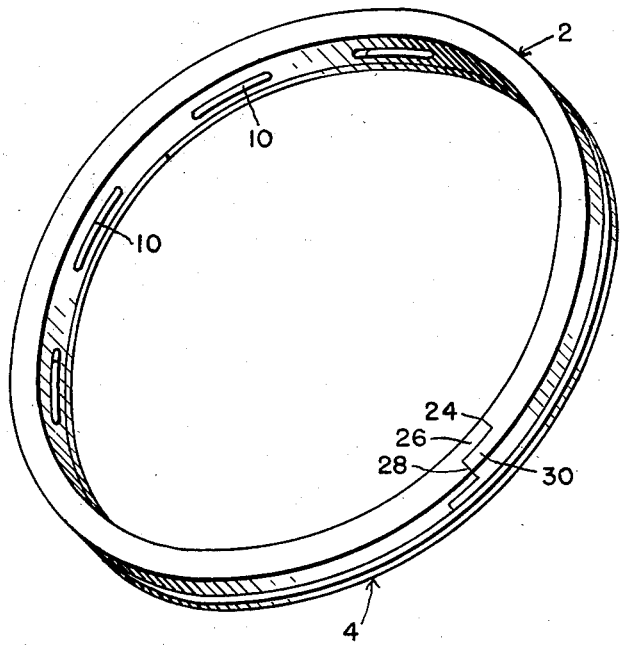
Figure 7 is a perspective view of the ring shown in Figure 1.
Figure 8:
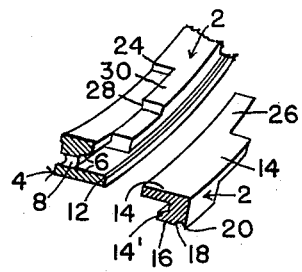

Figure 8 a perspective view of the ring sections when separated, partly in section and partly broken away, when looking in the opposite direction from Figure 2.

Referring now to the drawing more in detail, the invention will be fully described.

Upper and lower ring sections are represented by 2 and 4 each of which is split as is usual.

The lower section 4 as in Fig. 2 is provided with an annular groove 6 extending inwardly from the outer sides thereof forming a U-shaped section having upper and lower flanges with an inner annular connecting web 8. The web is provided with elongated openings 10 therethrough for the passage of oil.

2

The outer lower edge of the groove 6 is inclined at 12, as shown.

The upper ring section 2 is more or less U-shaped in cross section and has an upper flange portion 14 resting on the upper flange of the lower section 4 and a lower flange portion 14' extending into the groove 6, together with an outer annular web connecting the flanges.

The lower flange 16 of the section 2 terminates substantially in line with the upper sides of the slots 10 and has an annular recess 18 to provide a wiping edge for wiping the wall of a cylinder.

One end of the upper ring section is cut away as at 24 in Fig. 2, providing a tongue 26 forwardly thereof. The opposite end of the ring is similarly cut away at 28 to provide a tongue 30. As shown in Fig. 2, the tongue 26 is stepped providing an extension 26a. The step is somewhat deeper than the thickness of the flange 14. The recess thus provided as the two sections are fitted together is therefore transversely stepped and the tongue 30 fitting therein is correspondingly transversely stepped forming an especially effective seal for the two-section ring as a whole.

The tongues 26 and 30 are received in the recesses 28 and 24, as shown in Fig. 1, whereby opposite ends are connected for the necessary movement in the contraction and expansion of the ring section and to provide a gas-tight seal.

Opposite the joint in the upper section the lower section 4 at its opposite ends 4' and in the upper side thereof is provided with notches 32 and a key 34 which is secured to the upper section is received therein.

The said key will preferably be a component which is secured to the upper section by a suitable brazing, soldering or other operation and the arrangement acts as a seal as well as a key.

The key holds the ring sections against relative rotation so that the joints in the sections will not become aligned and thereby prevents leakage past the ring construction.

In a modification shown in Figs. 5 and 6 the upper side of the upper section is notched at opposite ends as at 36 and a key 38 received therein is secured to the lower section. This construction as above serves to prevent relative rotation of the section as well as providing a seal.

As seen in Figure 2 there are at least two vertical steps and at least one horizontal step to the joint of the upper ring section.

The invention may be embodied in other specific forms without departing from the essential characteristics thereof. Hence, the present embodiments are to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A piston ring construction comprising upper and lower split ring sections, said lower section having an outer annular groove extending inwardly from the outer side thereof intermediate upper and lower sides thereof providing an inner annular web, said web provided with elongated radial slots therethrough spaced therearound, and said upper section having a portion overlying the upper side of the lower section, an outer intermediate section around the outer side of said lower section and a lower section extending into said groove terminating at the upper sides of said slots, the upper section having an annular groove in a lower face thereof providing a circumferential outer wiping edge, opposite end portions of said upper section provided with interfitting recesses and tongues.

2. A piston ring construction comprising upper and lower split ring sections, said lower section having an outer annular groove extending inwardly from the outer side thereof intermediate upper and lower sides thereof providing an inner annular web, said web provided with elongated slots therethrough spaced therearound, said upper section having a portion overlying the upper side of the lower section, an outer intermediate section around the outer side of said lower section and a lower section extending into said groove terminating at the upper sides of said slots, the upper section having an annular groove in a lower face thereof providing a circumferential outer wiping edge, opposite end portions of said upper section provided with interfitting recesses and tongues, opposite end portions of said lower section provided with recesses, and a separate key secured to the upper portion of the upper section disposed therein disposed at a side thereof opposite to the said tongues and recesses.

3. A piston ring construction comprising upper and lower split ring sections, said lower section having an outer annular groove extending inwardly from the outer side thereof intermediate upper and lower sides thereof providing an inner annular web, said web provided with elongated slots therethrough spaced therearound, said upper section having a portion overlying the upper side of the lower section, an outer intermediate section around the outer side of said lower section and a lower section extending into said groove terminating at the upper sides of said slots, the upper section having an annular groove in a lower face thereof providing a circumferential outer wiping edge, adjacent opposite ends of one of said sections provided with notches, and a separate key secured to the other section received in said notches adapted to hold the sections against relative rotation.

4. A piston ring construction comprising upper and lower split ring sections, said lower section having an outer annular groove extending inwardly from the outer side thereof forming a U-shaped section having upper and lower flanges and an inner annular connecting web, said web provided with elongated slots therethrough spaced therearound, and said upper section having a flange portion overlying the upper flange of the lower section, an outer intermediate web section around the outer side of said lower section and a lower flange portion extending into said groove and terminating at the upper sides of said slots, said split ring sections being connected to each other with the ends of one ring diametrically opposite the ends of the other ring and the ends of one ring having tongue and recess sealing connection.

5. A split piston ring construction comprising upper and lower split ring sections, said lower section having an outer annular groove forming a U-shaped section having upper and lower flanges with a connecting web, said web provided with slots therethrough and said upper section having a flange portion overlying the upper flange of the lower section, an outer intermediate web section and a lower flange portion extending into said groove and terminating at the upper sides of said slots, one of said split ring sections being formed at its ends with inter-engaging tongues and recesses to provide a gas-tight seal.

6. A piston ring construction as defined in claim 5 wherein one of the tongues is stepped both longitudinally and transversely.

7. A piston ring construction comprising upper and lower split ring sections, said lower section having an outer annular groove extending inwardly from the outer side thereof to thereby form a ring which is U-shaped in cross-section with upper and lower flanges and an inner annular connecting web, said upper section being also U-shaped in cross-section and having upper and lower flanges and a web, said parts forming a groove, the upper flange of the upper section overlying the upper flange of the lower section and spaced therefrom, an oil groove on the under side of the lower flange of the upper section, an outer intermediate web ring section extending into the groove of the lower ring section, and an upper flange portion of the lower ring section extending into the groove of the upper ring section, said split ring sections being connected to each other with the ends of one ring section located at a point substantially diametrically opposite from the ends of the other ring sections, the ends of the upper ring section including a plurality of horizontal and vertical stepped surfaces whereby said ends form at least two vertical steps and at least a horizontal step on the upper horizontal and on the vertical side surfaces respectively of the said ring section.

8. A piston ring construction comprising upper and lower split ring sections, said lower section having an outer annular groove extending inwardly from the outer side thereof to thereby form a ring which is U-shaped in cross-section with upper and lower flanges and an inner annular connecting web, said upper section being also U-shaped in cross-section and having upper and lower flanges and a web, said parts forming a groove, the upper flange of the upper section overlying the upper flange of the lower section and spaced therefrom, an oil groove on the under side of the lower flange of the upper section, an outer intermediate web ring section extending into the groove of the lower ring section, and an upper flange portion of the lower ring section extending into the groove of the upper ring section, said split ring sections being connected to each other with the ends of one ring section located at a point substantially diametrically opposite from the ends of the other ring sections.

the ends of the upper ring section including a plurality of horizontal and vertical stepped surfaces whereby said ends form at least two vertical steps and at least a horizontal step on the upper horizontal and on the vertical side surfaces respectively of the said ring section, the said lower flange of the upper ring section and the groove of the lower ring section both having at least one inclined wall which whereby the inclined walls interengage when the ring sections are in assembled relationship.

ALFRED BERGERON.

REFERENCES CITED

The following references are of record in the file of this patent:

UNITED STATES PATENTS

| Number | Name | Date |
|---|---|---|
| 1,773,878 | Shannon | Aug. 26, 1930 |

FOREIGN PATENTS

| Number | Country | Date |
|---|---|---|
| 808,195 | France | of 1937 |